US012585630B2

(12) United States Patent
Zoldi et al.

(10) Patent No.: US 12,585,630 B2
(45) **Date of Patent: *Mar. 24, 2026**

(54) METHOD AND APPARATUS FOR ANALYZING COVERAGE, BIAS, AND MODEL EXPLANATIONS IN LARGE DIMENSIONAL MODELING DATA

(71) Applicant: FAIR ISAAC CORPORATION, Minneapolis, MN (US)

(72) Inventors: Scott Michael Zoldi, San Diego, CA (US); Shafi Ur Rahman, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/921,864

(22) Filed: Oct. 21, 2024

(65) Prior Publication Data

US 2025/0045265 A1     Feb. 6, 2025

Related U.S. Application Data

(63) Continuation of application No. 17/741,324, filed on May 10, 2022, now Pat. No. 12,158,871, which is a continuation of application No. 15/981,755, filed on May 16, 2018, now Pat. No. 11,354,292.

(51) Int. Cl.
*G06F 16/22* (2019.01)
*G06F 16/28* (2019.01)

(52) U.S. Cl.
CPC ...... *G06F 16/2264* (2019.01); *G06F 16/2237* (2019.01); *G06F 16/283* (2019.01); *G06F 16/288* (2019.01)

(58) Field of Classification Search
None
See application file for complete search history.

(56) References Cited

U.S. PATENT DOCUMENTS

| | | | |
|---|---|---|---|
| 6,301,579 B1 | 10/2001 | Becker | |
| 2005/0234761 A1 | 10/2005 | Pinto et al. | |
| 2009/0222410 A1 | 9/2009 | Aggarwal et al. | |
| 2010/0312793 A1 | 12/2010 | Brown et al. | |
| 2012/0303621 A1 | 11/2012 | Newnham et al. | |
| 2014/0279784 A1 | 9/2014 | Casalaina et al. | |

(Continued)

*Primary Examiner* — Neveen Abel Jalil
*Assistant Examiner* — John J Morris
(74) *Attorney, Agent, or Firm* — MINTZ; Qi Zhang, Esq.; F Jason Far-hadian, Esq.

(57) ABSTRACT

A system and method for analyzing coverage, bias and model explanations in large dimensional modeling data includes discretizing three or more variables of a dataset to generate a discretized phase space represented as a grid of a plurality of cells, the dataset comprising a plurality of records, each record of the plurality of records having a value and a unique identifier (ID). A grid transformation is applied to each record in the dataset to assign each record to a cell of the plurality of cells of the grid according to the grid transformation. A grid index is generated to reference each cell using a discretized feature vector. A grid storage for storing the records assigned to each cell of the grid is then created. The grid storage using the ID of each record as a reference to each record and the discretized feature vector as a key to each cell.

20 Claims, 15 Drawing Sheets

(56) References Cited

U.S. PATENT DOCUMENTS

| | | | |
|---|---|---|---|
| 2015/0052134 A1* | 2/2015 | Bornea | G06F 16/2282 |
| | | | 707/737 |
| 2015/0293750 A1 | 10/2015 | Yershov et al. | |
| 2015/0347480 A1 | 12/2015 | Smart | |
| 2016/0048766 A1 | 2/2016 | McMahon et al. | |
| 2017/0061320 A1* | 3/2017 | Fuchs | G06N 20/00 |
| 2017/0147941 A1 | 5/2017 | Bauer et al. | |
| 2017/0206466 A1 | 7/2017 | Zoldi et al. | |
| 2018/0060746 A1 | 3/2018 | Pouyllau et al. | |

* cited by examiner

Grid Data Storage

Original Dataset

Coverage Storage

Original Dataset

Grid Data Storage              Coverage Storage

| Key | Value | | |
|-----|-------|--|--|
| (3, 1, ...) | Key | Value | |
| | Class_0 | [1001, 2107, 3719] | |
| | Class_1 | [1273, 3991] | |
| (2, 7, ...) | Key | Value | |
| | Class_0 | [1002] | |
| (...) | [...] | | |

Grid Data Storage

| Key | Value | | |
|-----|-------|--|--|
| (3, 1, ...) | Key | Value | |
| | Class_0 | 3 | |
| | Class_1 | 2 | |
| (2, 7, ...) | Key | Value | |
| | Class_0 | 1 | |
| (...) | [...] | | |

Coverage Storage

FIG. 9

Score Storage                    Coverage Storage                    Original Dataset

METHOD AND APPARATUS FOR ANALYZING COVERAGE, BIAS, AND MODEL EXPLANATIONS IN LARGE DIMENSIONAL MODELING DATA

CROSS REFERENCE

The present application is a continuation of a U.S. patent application having U.S. patent application Ser. No. 17/741,324, filed May 10, 2022, which is a continuation of another U.S. patent application having U.S. patent application Ser. No. 15/981,755, filed May 16, 2018, the contents of which are incorporated herein by reference.

TECHNICAL FIELD

The subject matter described herein relates to large dimensional modeling data, and more particularly to a method and apparatus for analyzing coverage, bias, and model explanations in large dimensional modeling data.

BACKGROUND

Datasets continue to become more and more voluminous, and machine learning techniques continue to evolve in their sophistication. These ever-growing datasets are often not only large in terms of the number of records, or data points, but also in terms of the dimensionality of their phase spaces. Consider data emanating from mobile phone use, or network activity data arising from networks of computers. It is not uncommon to have thousands of variables or features representing such datasets. Making sense of such datasets using analytic techniques that were developed in the days of low data volume, can often reveal only partial information. Significantly, what is not revealed through these investigative techniques can often be important. Biases can often go unnoticed and crucial relationships between data points may not be well understood.

The growing sophistication of the machine learning techniques often come at the price of interpretability. Most modern machine learning techniques are not amenable to enquiry, and hence the biases learned by the models often go unnoticed. Ability to probe the datasets for identifying biases prior to building the models is also limited. Under these circumstances, any machine learning model built using these datasets could be inaccurate and likely to perform in an unexpected manner for a significant subset of the population or not be robust to a changing population. Furthermore, while using such machine learning models with complex architecture, often it is not evident how the model arrived at a specific decision or score.

Consider, for example, a case of a credit risk dataset, collected from a bank where historically, students accompanied by their wealthy parents had not only succeeded in getting new credit cards from the bank, but also, through their parents' support, managed to keep their accounts in good standing. Such a dataset would be biased in favor of students, since the dataset is skewed towards a subset of students who were evaluated to be a good credit risk. Any machine learning model developed from this dataset would unduly favor students. Realistically, most students are not the best credit risks. But, due to an inability to investigate the massive dataset in a manner that can reveal this bias, the model built using this dataset would find its way into the production environment, making decisions that would hurt the bank's business.

There is a business need for more accurate models that do not perform sub-optimally in production, and recent legal requirements to develop unbiased models have further highlighted these limitations. Analyzing these datasets and building machine learning models require a new data investigative method and apparatus. Further, there is growing need to understand if the model performs as expected, and to understand the basis for each of its decisions and scores.

As noted above, large multi-dimensional datasets have become ubiquitous. These datasets have millions, or even trillions, of records or data points, and having many thousands of dimensions. The complexity of analyzing such large, multi-dimensional datasets increases as the number of records or data points increase. Complexity further increases in proportion to the dimensionality of the dataset.

Hence, traditional techniques for analyzing such datasets has involved sampling the dataset and looking at the subset of the dataset to draw inferences. In such methods, it is hoped that the sampled dataset is a true representation of the original dataset, and inferences drawn on the sampled dataset are equally applicable on the original larger dataset. If sufficient care is taken in the sampling exercise, the sampled dataset can often be a reasonable representation of the original dataset. However, the sampling methods usually ignore those data points that are potentially of the most interest to the business cases.

For example, network activity data can be tremendously voluminous and contain malicious activities, though debilitating, can be relatively miniscule in their volume. Further, the malicious activities are often not explicitly identified a priori. Trying to understand the nature of a cyber threat by sampling a large dataset would leave most, if not all, of the malicious data points out of the sample due to laws of probability. In the worst-case scenario, an erroneous conclusion can be drawn that there is no malicious activity represented in the dataset. Even in the best-case scenario, when some of the malicious data points are selected into the sampled dataset, only partial and hence sub-optimal learning of the nature of malicious activities is determined. Hence, what is needed is a system and method to retain all the data points in an investigation while having a mechanism for simplifying the analysis.

SUMMARY

This document describes a method and apparatus for investigating data phase spaces of large dimensional modeling data. More specifically, a method and apparatus is presented that can probe the phase spaces for data coverage and expose weak points and understand potential biases within the dataset. While the method and apparatus works for investigating small datasets, a primary value is realized while working with large multi-dimensional datasets. The method and apparatus can also investigate models for weaknesses and provide explanations for each decision made by the model, making it a useful tool as an explainable artificial intelligence (AI) system.

In some aspects, the system and method provides a simple and yet comprehensive and effective computer-implemented framework for processing and analyzing large dimensional datasets. This framework makes it possible to analyze any-sized dataset in a very cost-effective manner to understand hidden biases in the data, as well as understand the nature of the data distribution. This framework can be used to process both unlabeled and labeled datasets, and allows for a better understanding of the dataset than possible with traditional data analysis techniques. Significantly, the systems and methods described herein provide a mechanism for generating explanations for an observed score of a data point provided by a model. This enables usage of "black box" machine learning models in situations where explanations of how the model arrived at the score are necessary. The framework is architecturally agnostic, as it does not depend on any specific architecture of the model, but only on the score distribution. The system and method further enable a user to probe the model phase space, to identify weak points in the model where a score distribution is questionable and open to synthetic attacks.

In some aspects, a system and method for analyzing coverage, bias and model explanations in large dimensional modeling data are described. A system and method includes discretizing three or more variables of a dataset to generate a discretized phase space represented as a grid of a plurality of cells, the dataset comprising a plurality of records, each record of the plurality of records having a value and a unique identifier (ID). A grid transformation is applied to each record in the dataset to assign each record to a cell of the plurality of cells of the grid according to the grid transformation. A grid index is generated to reference each cell using a discretized feature vector. A grid storage for storing the records assigned to each cell of the grid is then created. The grid storage using the ID of each.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 9 shows data from the example in FIG. 8, expressed using an alternative implementation. Note that the value of the storage for each discretized feature vector is itself a key-value pair, where the key is the class label and the value is the required data;

When practical, similar reference numbers denote similar structures, features, or elements.

DETAILED DESCRIPTION

This document describes a system and method to retain all the data points in an investigation while having a mechanism for simplifying the analysis. One way the investigation of the data points is simplified is by grouping the data points based on similarity. Once the groupings are established, such grouping can lead to significant ease in the analysis while ensuring that each data point has been considered in the analysis. Thus, inferences derived from the analysis would be applicable to the entire dataset, optimizing the learning results from the analysis.

In some instances, a method that employs grouping based on similarity can be time consuming and cumbersome, adding substantial computer processing overhead to the analysis. It also requires certain degree of expertise to carry out such analysis, as this approach requires defining similarity metric which can be tricky both in terms of its mathematics as well as dependence on the domain understanding. Thus, a grouping method for simplifying the analysis is often slow and inconsistent from one analysis to another.

Accordingly, in some implementations, this method includes a mechanism to analyze the entire dataset without the need for sampling, while simplifying the complexity of the analysis space in fast and consistent manner. The method relies on grouping the data points on each dimension of the multi-dimensional dataset. The process of grouping the data points along a single dimension is referred to herein as feature discretization, which is more fully described below.

Grid Transformation

Figure 1:
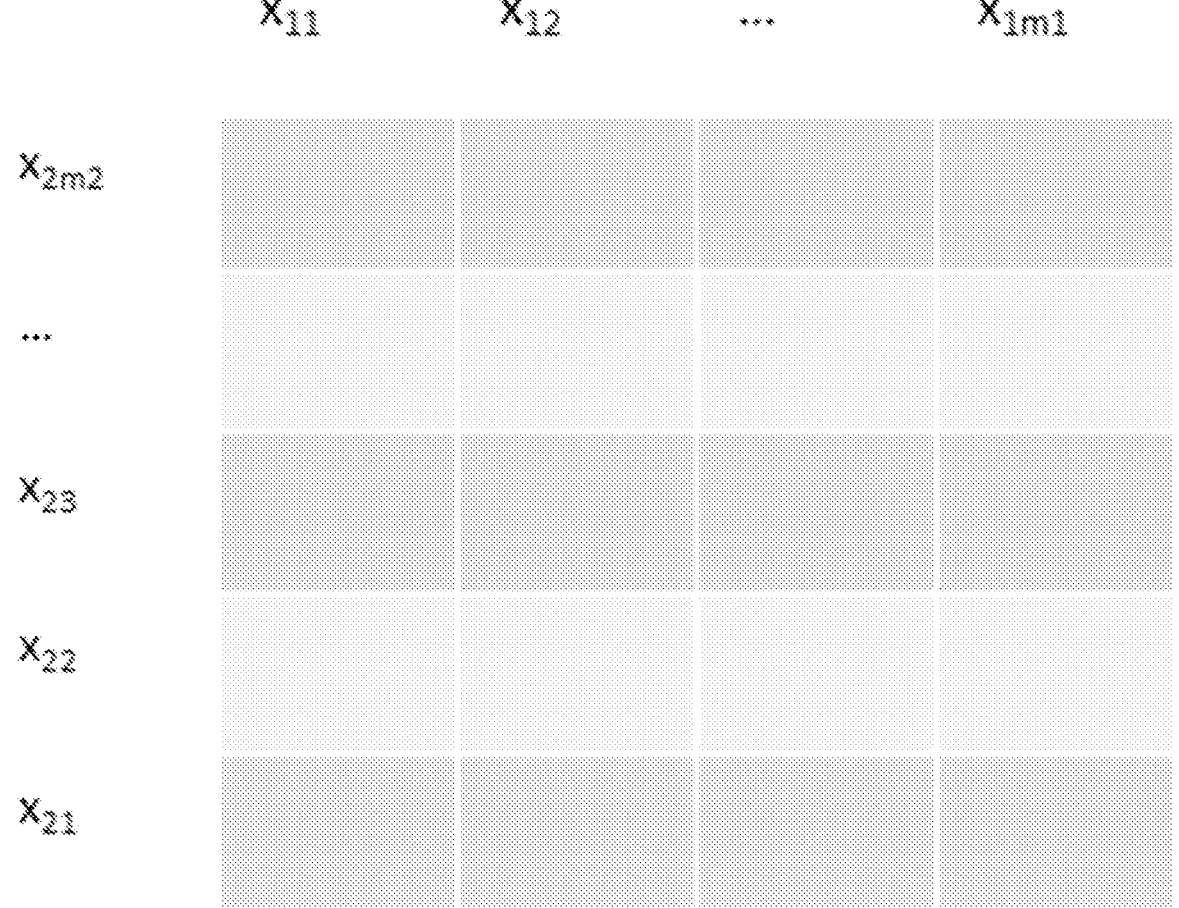
FIG. 1 shows a grid of cells formed by discretizing two features into various value bins.

Each dimension of a dataset is variously called feature, factor, variable or feature variable, and which can be used interchangeably without loss of generality. To reduce the complexity of analysis space, each feature of the dataset is discretized. Each feature is split into value ranges, called bins, resulting in a discretized feature space that can be visually represented as a grid structure with multiple cells. A record is assigned to one, and only one, of these cells. Consider, for example, a two-dimensional dataset with two features $x_1$ and $x_2$, which are discretized into $m_1$ and $m_2$ number of bins respectively. Thus, $x_1$ has bins $x_{11}$, $x_{12}$, . . . $x_{1m1}$ with adjacent bins sharing adjacent real values at their respective boundaries. $x_2$ has bins $x_{21}$, $x_{22}$, . . . $x_{2m2}$ with same properties at the boundaries as $x_1$. The phase space of such a dataset would be discretized into $m_1*m_2$ unique number of cells as shown in FIG. 1.

A grid transformation process is then applied to a record of a dataset such that each feature is discretized, and the record is assigned to one and only one of the cells in the resultant grid. In the grid space, two records are said to have the same discretized feature vector when both lie in the same cell after grid transformation is applied. Thus, even if two records do not have the exact same feature vectors, they will have the same discretized feature vector and are treated to be equivalent if their values lie within the same discretized bins for each of the features. Such same records reside in the same cell as formed by the discretized bins of all features.

Figure 2:
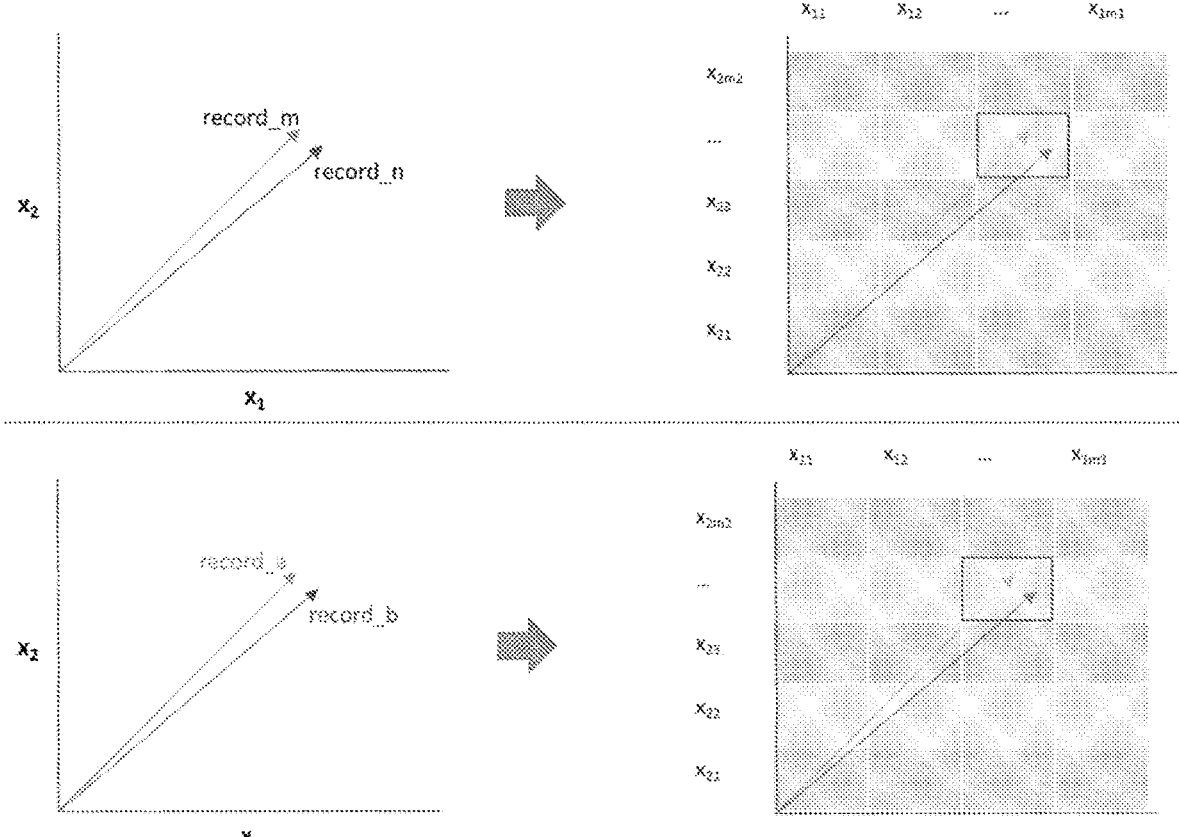
FIG. 2 shows two records with different feature vectors in a two-dimensional phase space being assigned to the same cell.

FIG. 2, for instance, shows two records, record_a and record_b, which have slightly different feature vectors, but due to the process of feature discretization, end up in the same cell and have the same discretized feature vector. The process of feature discretization thus translates the infinite number of unique combinations into manageable number of finite combinations, making it viable to study the data phase space.

Feature Discretization

To operationalize feature discretization on a large scale, each feature is discretized into value range bins. Discretization can be done in multiple ways. Two methods are described here as examples. In entropy bins, each feature is divided into bins such that the overall entropy is maximized. This is done when one or more tags or labels for each record are available. In equi-sized bins, each feature is divided into decile bins with equal populations. This is required when one or more tags or labels for the records are not available.

In both approaches, each bin should have a minimum number of data-points, n, for stable statistics, and bin creation can vary based on application. The criterion of minimum number of data-points applies to any alternative method used for feature discretization.

In the entropy approach, to control the number of discretize bins of each feature, the bins are first discretized to maximize the entropy. Then, two adjacent bins are grouped together such that it leads to the least reduction in entropy. Adjacent bins are grouped until a number of data points in each bin is greater than n or the loss in entropy is less than an acceptable loss threshold, $\zeta$. This ensures an optimal number and size of bins for each feature. This has impact on minimum coverage that is discussed in further detail below.

Coverage

All data points must reside in one of the cells. "Coverage" of a cell is defined as the number of data points that reside in that cell. Let, i be the index of a cell, where i is indexed in the discretized feature space. Let, C denote coverage. Accordingly, $C(i)=\#$ of data points in the cell, i.

Sufficient coverage in a cell i, implies that a robust statistical pattern in that cell i. can be obtained. Due to large number of features, many cells end up in the grid. For instance, if there are n features in the dataset, each with m number of discretized bins, then the total of number of cells is $m^n$. Accordingly, the number of cells increases exponentially with the number of features, which is an artifact of dimensionality.

Figure 3:
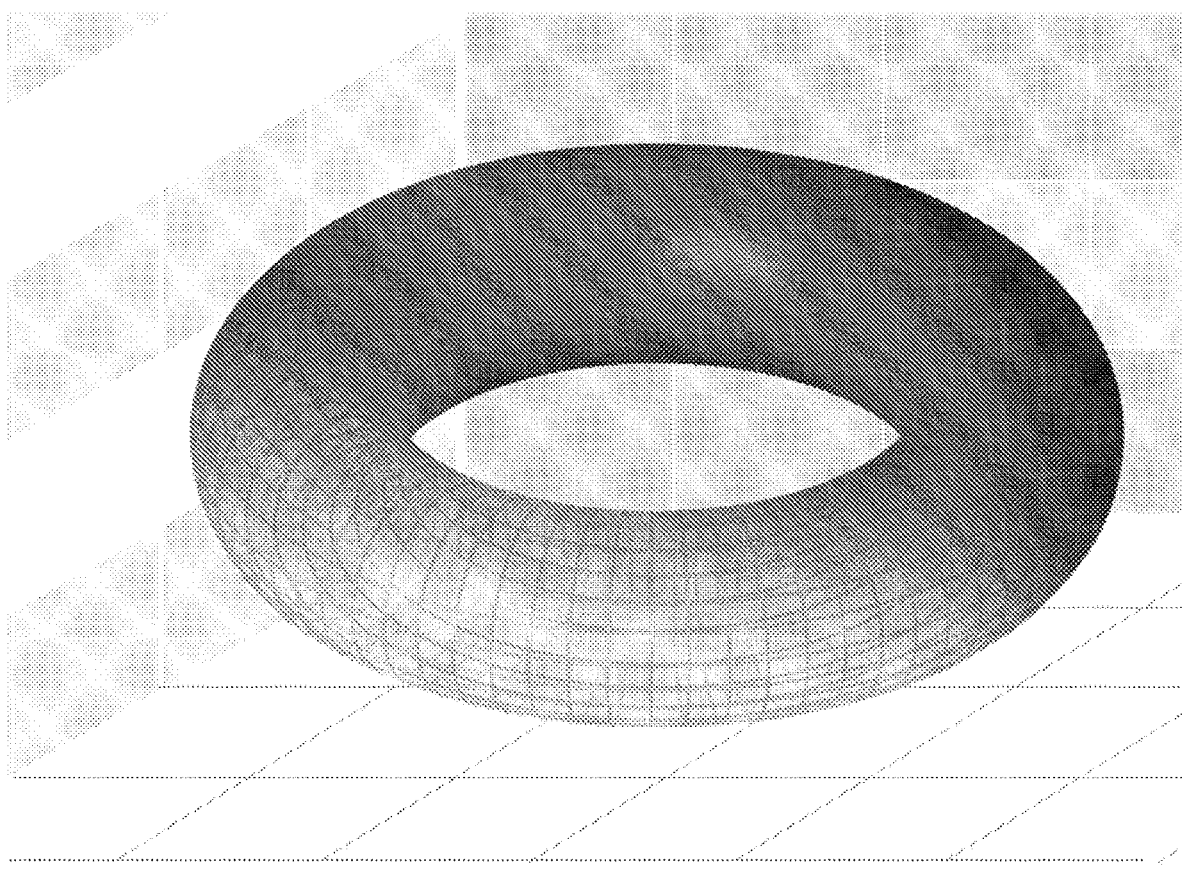
FIG. 3 shows a distribution of data points in which, due to a large number of features and bins, has sparse coverage, even though some cells have adequate coverage.

As shown in FIG. 3, the distribution of data-points in such a discretized grid is sparse due to large number of cells. Most cells do not have any data points, or have very few data points; in other words, they have 0 or very low coverage. Manifold hypothesis suggests though that most data points in a data set reside on manifolds of significantly lower dimensionality. Accordingly, some of the cells have very high counts even though overall distribution is very sparse.

Grid Indexing and Discretized Feature Vectors

In some implementations, the method includes one or more steps which data phase spaces are referenced. When a dataset is received, the first step is to carry out the feature discretization as discussed above. The resultant grid transformation is encoded for each record through a process of grid indexing. This is required for correctly assigning and identifying an arbitrary data point and the cell to which it belongs. For effective representation of the cells, a vector for indexing is used instead of the more traditional scalar index. Using a vector index simplifies the lookup of a specific cell and the corresponding data points. The vector index has the same number of dimensions as the number of dimensions of the predictor set and represents the discretized feature vector that results from grid transformation of a record.

For each discretized feature, the bins are annotated with numerals ensuring ordinality, starting from number 1. Thus, for the feature variable $x_1$, the bins can be annotated $x_{11}$, $x_{12}$, . . . $x_{1m1}$ with indices 1, 2, . . . $m_1$ respectively. Similar annotation is done for all the features. Thus, each data point is represented by a discretized feature vector, z, of discrete numeric values representing the indices. It is worth noting that these indices retain ordinal property. For example, the value range for bin annotated "1" is lower than the value range for the bin annotate "2". Data points which transform to same discretized feature vector reside in the same cell. This representation is useful for finding other data points in the same cell for carrying out data analysis.

Figure 4:
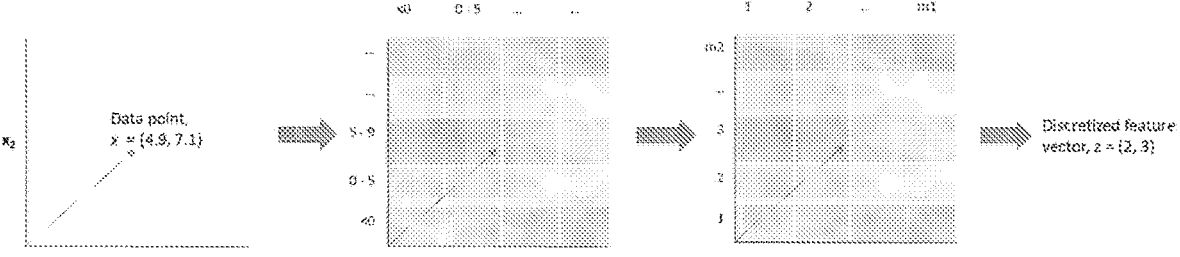
FIG. 4 shows data points (4.9, 7.1) represented by discretized feature vector (2,3) to uniquely identify its cell in the grid.

FIG. 4 illustrates the grid indexing process, resulting in the corresponding discretized feature vector. The ordinality enforced on the indexing of each of the dimension also leads to some desirable properties that are more fully described below.

Data Storage for Efficient Analysis

Irrespective of the size and the dimensionality of the dataset, the process of data handling remains the same. Once a dataset is received, it goes through the process of grid indexing. This means that each record in the dataset is processed through a grid indexing module to generate its discretized feature vector. Then two data stores are usually required for the analysis. The first data store is used to store the original records for each cell in the grid. This is called a grid data storage. The second data store is used to store the coverage information for each cell in the grid and is called a coverage storage. While for some use cases the former can be an optional step, the latter is a necessary requirement for all use cases.

As discussed above, the grid representation of the dataset can often lead to sparsely populated cells. On the other hand, some cells have adequate coverage. This presents an opportunity to gain significant efficiencies in the storage space, and in search and retrieval times. To achieve this, a data store technique is employed for storing sparse information. Using the discretized feature vector of a data point as the key in a key-value storage, the memory overhead of storing cells for which there is 0 coverage need not be carried. A key-value storage database is preferably used for easy storage of the data points. The database can be in-memory for further efficiencies.

Grid Data Storage

Each record has a discretized feature vector representation. This is used as a key of the key-value pair in the grid data storage. The value part of the key-value storage contains a reference to the original record. Since more than one record can have the same discretized feature vector representation, the value part is implemented as a list data structure. Any other equivalent representation that could reference to one or more records can be used, though memory and computational efficiencies should be considered in any implementation.

Each data point is tracked through a primary identifier (ID), which uniquely references the record in the original dataset. In the absence of an ID, a new ID is generated using any suitable technique. For example, one technique is to use the record number as the ID. In another implementation, the dataset includes an account number and a timestamp which can uniquely identify the record. In that case, an ID can be generated using the concatenation of account number and the timestamp.

Figure 5:
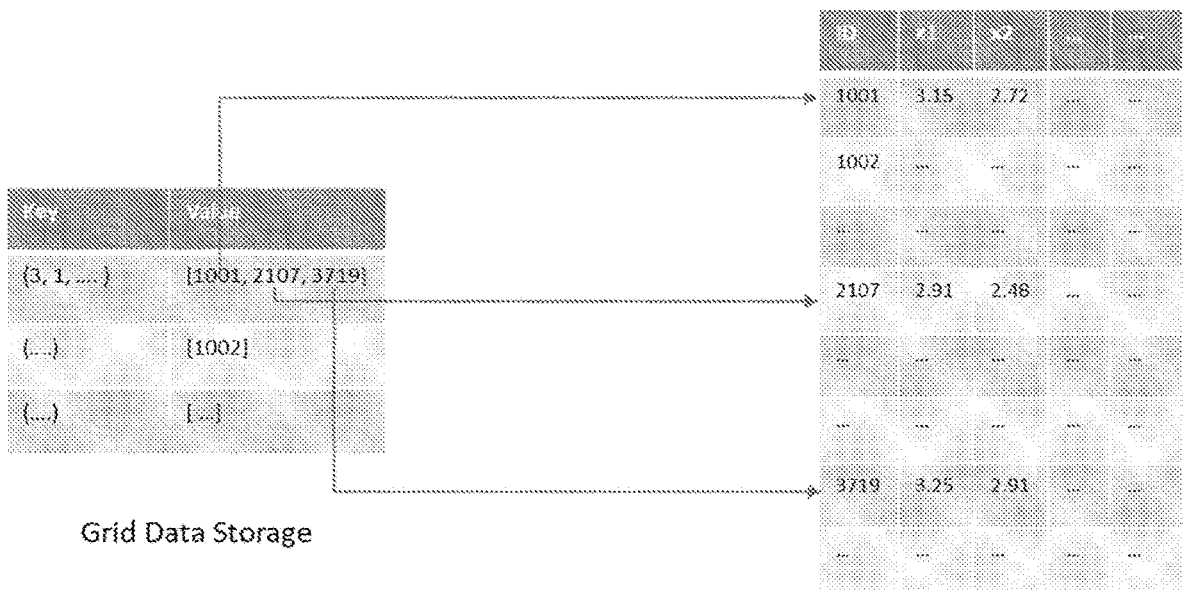
FIG. 5 shows a schematic representation of the grid data store.

FIG. 5 shows a schematic representation of the grid data store. In the original dataset each record has an ID that uniquely identifies the record. After the grid transformation, the first record with ID "1001" maps to the discretized feature vector (3, 1, . . . ). In the grid data store, this discretized feature vector is stored as the key of the key-value pair. The corresponding value is a list, with one of the entries as "1001". It is worth noting that in this example, the grid transformation of the records with ID "2107" and "3719" also yield the same discretized feature vector (3, 1, . . . ). Hence, the other entries in the value list corresponding to the key=(3, 1, . . . ) are "2107" and "3719".

Coverage Storage

Analyses pertaining to exploring and investigating the data phase space requires assessing and understanding how the data points are distributed in the phase space. This information can be extracted from grid data store, but this can be computationally expensive if required to be done repeatedly. Instead, this information is stored in the coverage storage, which then provides a convenient summary of the count of data points in the various cells in the discretized grid space. As discuss below, this provides a convenient and cost-effective way for computer-implemented exploration and investigative analyses of the data phase space.

Figure 6:
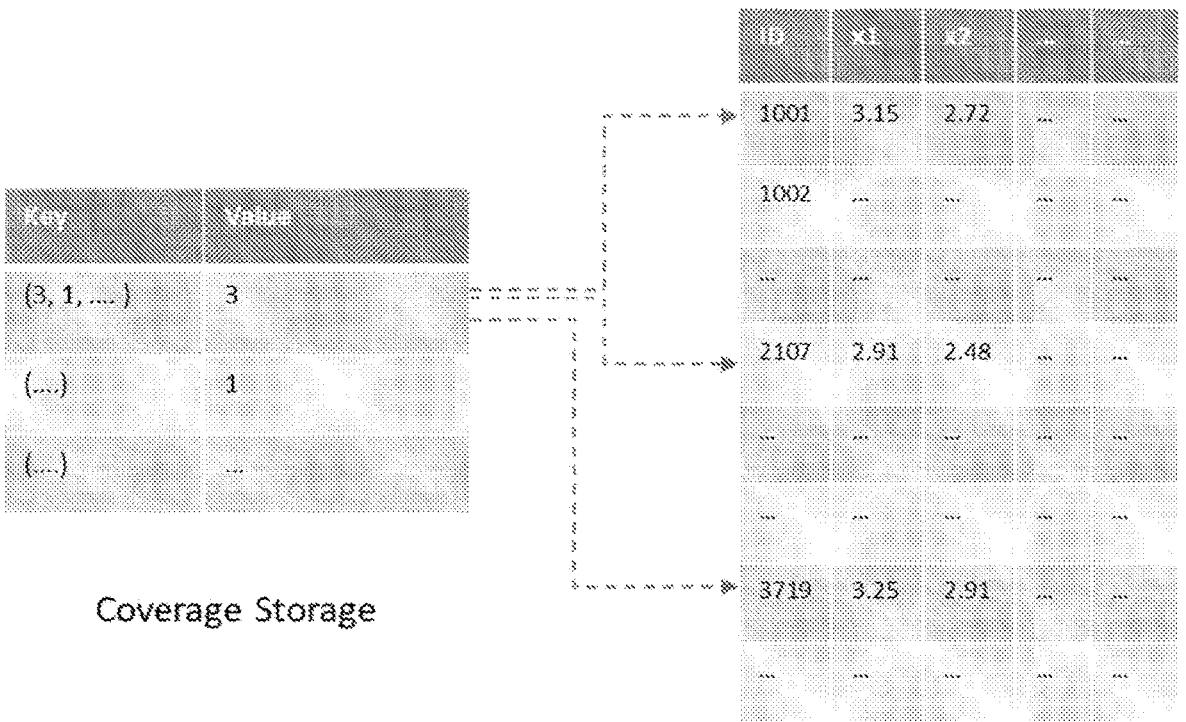
FIG. 6 shows a schematic representation of the coverage storage, alongside the original dataset for which it purports to summarize the coverage data.

In the coverage storage, the discretized feature vectors are used as the key corresponding to each cell. The coverage data is stored as the value in a key-value pair where the key is the corresponding discretized feature vector. This key-value storage provides a powerful mechanism to represent the coverage data for the discretized grid space and access this data for the various analyses discussed herein. FIG. 6 shows a schematic representation of the coverage storage, alongside the original dataset for which it purports to summarize the coverage data. For each discretized feature vector that represents a cell in the phase space grid, it also represents the number of data points in the cell.

Figure 7:
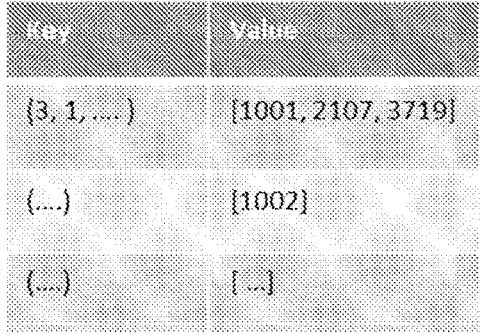
FIG. 7 shows a mechanism for generating coverage storage data from a grid data storage, where a value in the coverage storage is the size of the corresponding value in the grid data storage, and where the coverage of the cell is represented by the key.
Figure 7:

The coverage storage can be populated in several ways, as discussed above. In one way, the original dataset is directly accessed. For each record, after the grid transformation, the coverage storage is accessed for the discretized feature vector. If there is an existing entry in the coverage storage, the value is incremented by 1. If there is no existing entry in the coverage storage, a new entry with the value of 1 is made. In another way, instead of working with the original dataset, the grid data storage is accessed. For each key in the grid data storage, an entry for the same key is made in the coverage storage. The value in the coverage storage is the size of the list stored in the value part of the grid data storage. This approach is shown in FIG. 7. Note that the coverage storage does not store cells with a coverage value of 0. The absence of the corresponding discretized feature vector as a key in the coverage storage is the indication of a coverage value of 0.

Storing Labelled Data

Many datasets represent multiple classes. In such datasets, each record is often labelled to identify the class membership. For instance, a dataset comprising of credit card transactions may have each transaction identified as fraud or non-fraud. Similarly, in a dataset pertaining to credit accounts, each account may be marked as defaulted or not-defaulted. Such datasets have what are called binary classes. Taking the example of credit accounts, the records might be labelled as "pays-on-time", "1-month-delay", "2-month-delay", "default", etc. Such datasets are multi-class datasets. Thus, labels could be either binary, or could be multi-class.

Figure 8:
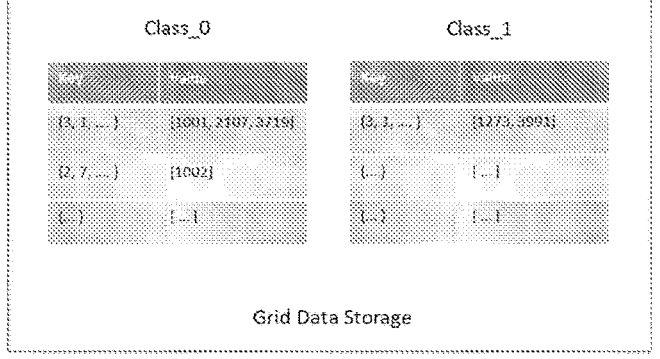
FIG. 8 shows a grid data storage and a coverage storage for a two-class dataset, Class_0 and Class_1, where the discretized feature vector (2, 7, . . . ) has only one data point of Class_0 and none of Class_1.
Figure 8:
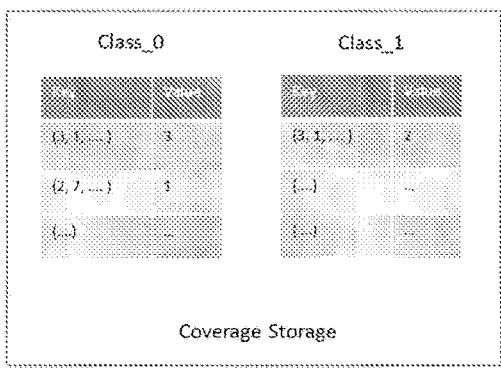

Creating the grid data storage and coverage storage for such datasets requires extra processing. Since compute time is often of primary concern, the storage is configured for fast information retrieval. The grid data storage and coverage storage can be created in a number of configurations. In one implementation, a separate grid data storage and coverage storage are created for each of the classes. This allows for fast access at the time of analysis. Some cells may have data points belonging to only a subset of the classes. In such cases the grid data storage and coverage storage for those classes for which there are no data points in the cell have no entries. When looking for the discretized feature vector corresponding of that cell, there won't be a hit in the storage while looking up the key. This is shown schematically in FIG. 8 below for a two-class dataset.

In another implementation, only a single grid data storage and a single coverage storage is created. But instead of storing a list of IDs as the value part of the key-value pair, it stores a key-value pair, where the key represents the class label, and in the value of this key is the list containing the IDs of the records. The advantage of this implementation is that it is more concise from a traversal perspective, but can be more memory intensive than other implementations. FIG. 9 shows a schematic example of this implementation, using the data from the previous examples.

Data Analysis

An advantage of the grid approach is that it can be used to easily make sense of datasets. Traditional techniques that were developed for low data volume can many times fail to reveal the exact nature of the dataset. More specifically our focus has been to identify biases in the data and understand crucial relationships in the data in a convenient manner.

Grid Compaction

While human beings are capable of visualizing data in 2-dimensions, it is very difficult, if not impossible, for humans to visualize data in higher dimensions. Traditional techniques use plotting and graphing which can be quite hard to interpret. Some systems and methods described herein perform analysis of two feature variables as a function of a third feature variable, using the coverage storage as the basis for the analysis. Visualization techniques are still used, but the underlying grid structure provides a framework that can be processed by a computer processor to visualize to a user in a manner that is easy to interpret and understand.

To perform the analysis, a process called grid compaction is performed. First, the n variables to be investigated together are identified. Then, the coverage data is projected from the higher-level grid to a simpler n-dimensional grid. To do so, the process iterates through each cell in this n-dimensional grid, and for each of these cells, identifies all the cells from the higher dimensional grid that need to collapse into this cell. The data points in these higher dimensional cells need to be grouped together into the lower dimensional cell. This is done by summing up the coverage of all these higher dimensional cells and assigning the total as the coverage of the lower dimensional cell.

Consider, for example, compaction of 3-dimensional grid space to a 2-dimensional collapsed grid. Let the dimensions be annotated by indices i, j and k respectively along the discretized feature vectors, $z_1$, $z_2$ and $z_3$. Further let Cijk and C'jk represent the coverage of the cells in the original and compacted grid spaces. The following mathematical formula can be used to arrive at the compacted grid space:

$$C'_{jk} = \sum_i C_{ijk}$$

Figure 10:
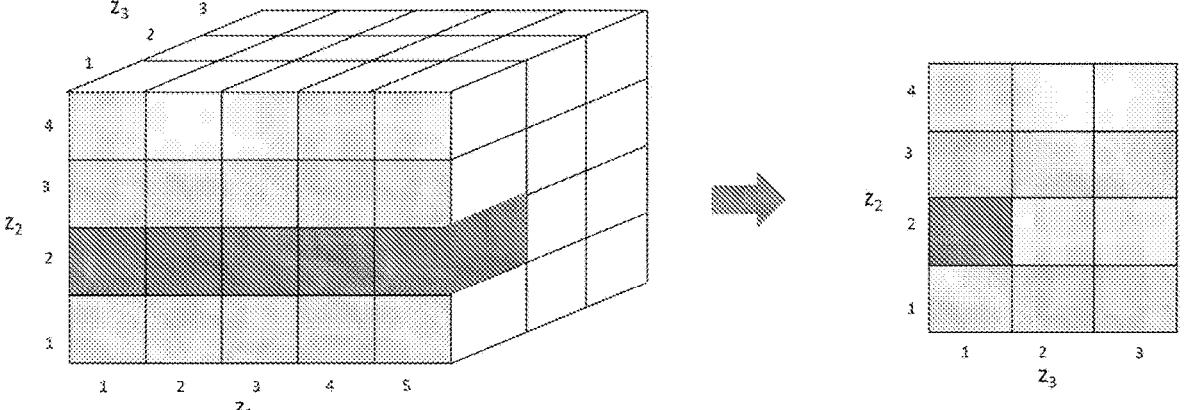
FIG. 10 shows grid compaction of an original 3-dimensional grid to a 2-dimensional collapsed grid, where for each cell in the 2-dimensional collapsed grid, there are 5 cells in the 3-dimensional grid.

FIG. 10 illustrates the corresponding grid compaction process from the original 3-dimensional grid space to a 2-dimensional collapsed grid. The 5 shaded cells in the 3-dimensional grid are collapsed into a single shaded cell in the 2-dimensional grid by summing up the entries in the 5 shaded cells in the original grid.

Tri-Variate Visualization

Figure 11:
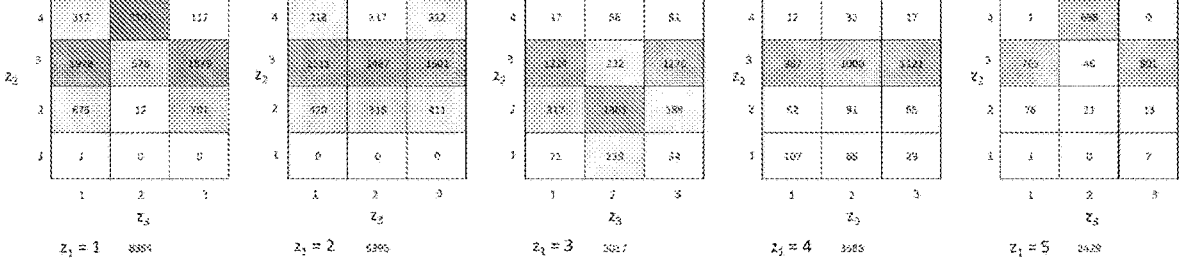
FIG. 11 shows a 3-dimensional compacted grid displayed as a series of 2-dimensional heatmaps for each of the bins of the third dimension, where each of the bins correspond to a count for the original feature vectors as identified during the feature discretization process.

To visualize a dataset, data compaction of the grid space to a 3-dimensional grid is performed. This is done by iteratively selecting a set of three discretized features {$z_a$, $z_b$, $z_c$} and carrying out the grid compaction process of the original grid space to this set of features. For a given combination of {$z_a$, $z_b$, $z_c$}, heatmaps are plotted along 2 of the 3 dimensions, for each cell value of the varying third dimension. Thus, a series of 2-dimensional heatmaps are generated for each of the bins of the varying third dimension. Accordingly, where each of the bin represents a value range for the original feature variable, a coverage of each cell in the 2-dimensional grid is displayed. Further a total coverage in the 2-dimensional grid can also be displayed, which is the coverage of the cell in the third dimension. Exemplary resultant heatmap graphs are shown in FIG. 11. The coverage of each cell in the 2-dimensional grid is displayed. Further a total coverage in the 2-dimensional grid is also shown, which is the coverage of the cell in the third dimension. A distinct pattern in the data can be identified using such heatmaps.

Analysis performed on a given 3-dimensional compacted grid in accordance with systems and methods disclosed herein can often yield useful insights. An expert who is used to working with this visualization could easily identify distinct patterns in the data using the heatmaps. While human analysis of a huge multitude of possible compacted grids is impossible, the systems and methods described herein allow for identifying compacted grids with the potentially most interesting insights, using a variety of statistical metrics to prioritize the compacted grid to be analyzed, as described below.

Identify Biases in the Datasets

Biases arise in the dataset if the underlying process generating or collecting the data points do not conform to the expected distribution. Biases also arise when relationships may be present in data that might violate regulation with regard to business use of a model. There is no mathematical formula for identifying the bias. This makes it difficult to investigate datasets for biases and is the primary reason why biases often go unnoticed in complex large dimensional datasets. Accordingly, the systems and methods disclosed herein can provide a set of tools for processing, analyzing and querying a dataset with respect to identifying bias.

With the availability of the tri-variate heatmaps, it becomes reasonably convenient to look for unexcepted counts. For instance, in a credit application dataset, assume that the dataset is biased towards a particular characteristic of the applicants. In such a case, while analyzing the tri-variate heatmaps, the cell corresponding to that characteristic would show counts disproportionate to what is the common understanding and would stand out to a practitioner.

Binary Class Data

Binary class data require further analyses to understand the class distribution and to identify any potential biases. Similar to a case of analyzing unlabeled data described above, the bias identification is eventually a human expert-driven process. Nevertheless, the systems and methods described herein can determine how easy or difficult it is for the human expert to identify the biases conveniently and effectively.

The process first includes performing data compaction of the grid space to a 3-dimensional grid. This is done by iteratively selecting a set of three discretized features {$z_a$, $z_b$, $z_c$} and carrying out the grid compaction process of the original grid space to this set of features. The two classes can be annotated as B and G. For a given combination of {$z_a$, $z_b$, $z_c$} the indices can be annotated by i, j, k respectively. For each cell C'$_{ijk}$ in the compacted grid space defined by {$z_a$, $z_b$, $z_c$}, coverage CB'$_{ijk}$ and CG'$_{ijk}$ represents the coverage corresponding to the two classes, B and G.

Further let $n_B$ and $n_G$ be count of B and G classes in the total population. Accordingly:

$$f_{Bijk} = \frac{C'_{Bijk}}{n_B}$$

And therefore:

$$f_{Gijk} = \frac{C'_{Gijk}}{n_G}$$

The weight of evidence (WOE) for the cell annotated by ijk can be defined as:

$$WOE_{ijk} = \log\frac{f_{Bijk}}{f_{Gijk}}$$

Figure 12:
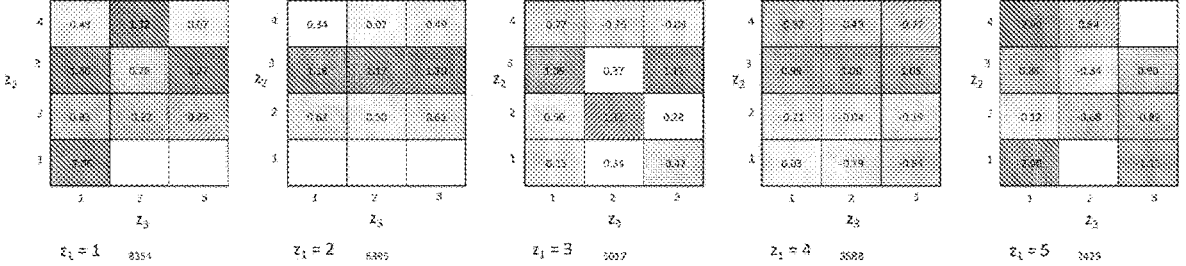
FIG. 12 shows a 3-dimensional compacted grid displayed as a series of 2-dimensional heatmaps for each of the bins of the third dimension, where each of the bins correspond to a weight of evidence (WOE) for the original feature vectors of two classes as identified during the feature discretization process.

Once the weight of evidence has been computed for each cell in each grid, then a process similar to the tri-variate analysis is executed. For a given combination of $\{z_a, z_b, z_c\}$ the heatmaps can be plotted along 2 of the 3 dimensions, for each cell value of the third dimension. Thus, a series of 2-dimensional heatmaps are obtained for each of the bins of the varying third dimension. Recall that each of the bin represents a value range for the original feature variable. The weight of evidence of each cell in the 2-dimensional grid is displayed. Further a total coverage in the 2-dimensional grid is also shown, which is the coverage of the cell in the third dimension. FIG. 12 illustrates the resultant heatmap graphs. Analysis of these grids provides a quick way to identify how the two classes are concentrated in the 3-dimensional grid space. The weight of evidence of each cell in the 2-dimensional grid is displayed. Further a total coverage in the 2-dimensional grid is also shown, which is the coverage of the cell in the third dimension. Accordingly, a distinct pattern in the data can be identified using such heatmaps.

Bias can possibly be detected based on joint features that show strong non-uniformity-of-odds relationships between combinations of feature bins in the grid. This could be reviewed manually by a user studying the maps, or through automated metrics defined for detecting nonlinearity in odds rates associated with the combination of bins such as standard deviations from average odds associated with each variable in own bin range. When a particular 2-dimensional bin shows strong nonlinearity, this may point to bias or correlations that are non-causal.

As an example, if one feature was related to accident rates based on temperature, and the other feature was related to accident rates associated with water, one could use these techniques to identify cells where the combined risk of an accident was substantially exaggerated in one cell that would cause one to review possible relationships between the features of water and temperature that may drive differentiated risk, i.e., identification of ice. In some implementations, 2-way or 3-way combinations of risk associated with features can then be reviewed as to whether they could imply bias in the data that would go undetected in the machine learning algorithm. If bias is suspected, the feature combinations could be prohibited from model creation either by removing the feature combinations or setting to default odds. In other situations, this may also allow for improved feature creation where a function of variables with strong nonlinearity is expressed as new variable that replaces two or three individual variables.

Explaining Model Scores

Many applications of modern machine learning models, irrespective of their architecture, can be hindered due to an inability to understand how the model functions. One aspect of this problem is to understand what kind of decision boundary the model has learned, which in turn determines its overall performance and decision-making process. Another aspect of this problem is to understand what factors it considered in arriving at a specific decision and provide an explanation for its individual decisions. Accordingly, the framework supporting systems and methods described herein can be used to understand a model's decision boundary and explain its decisions.

Score Storage

Analyses pertaining to exploring and investigating a model, irrespective of the model's internal architecture, requires assessing and understanding how the scores generated by the model corresponding to the training data points are distributed in the score phase space. This information can be layered on top of the grid data store, but this can be computationally expensive if repeatedly done. In some implementations, this information can be stored in the score storage, which then provides a convenient summary of the summarizing the score distribution in the various cells in the discretized grid space. As discussed below, this provides a convenient and cost-effective way for carrying out the exploration and investigative analyses of the score phase space.

In accordance with a process executed by a system or method, each data point in the training dataset is first scored using the model. For scoring purpose, the scoring mechanism used is that which is appropriate for the model's architecture. Then, the score data is stored. However, instead of storing all the scores corresponding to all the data points in a cell, only the statistical metrics describing the score distribution are stored in the cell. A commonly used metric is the mean of the scores, $\mu$. Another important statistical metric is the standard deviation, $\sigma$, and both $\mu$ and $\sigma$ can be used in various implementations, without limitation. The methodology described herein does not limit use of any other relevant statistical metric. The relevant metrics for each cell are stored as an ordered list.

Figure 13:
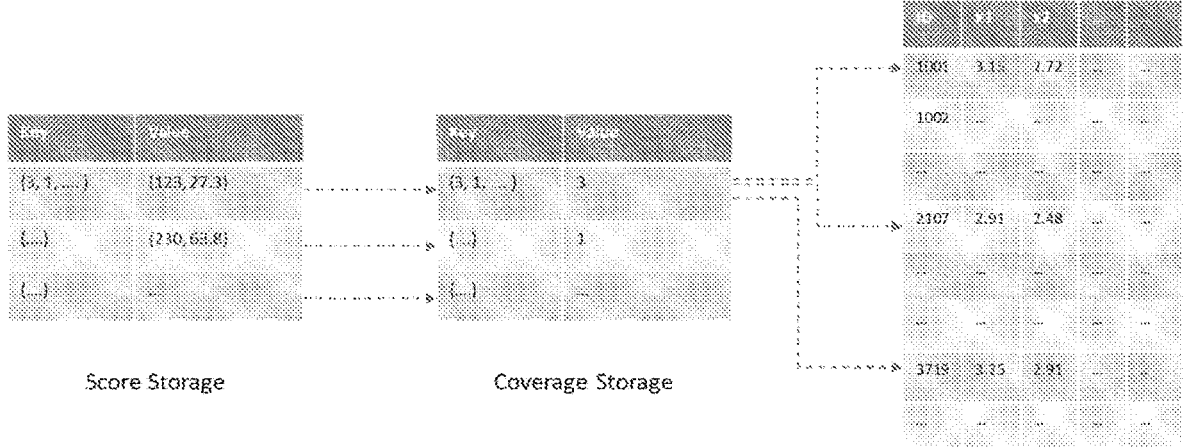
FIG. 13 is a schematic representation of Score Storage, corresponding to the schematic data shown in FIG. 5. In this example, we store $\{\mu, \sigma\}$ of each cell.

FIG. 13 shows a schematic representation of the score storage, alongside the coverage storage and the original dataset for which it purports to summarize the score data. For each discretized feature vector that represents a cell in the phase space grid, it represents the statistical metrics of the score distribution in the cell. The number of data points in those cells are referenced in the corresponding coverage storage. In this example, we store $\{\mu, \sigma\}$ of each cell. Note that there is no direct reference to the original dataset except either through the grid data storage or by applying grid transformation on the original dataset. The dotted reference lines are shown for illustrative purposes only.

In the score storage, the discretized feature vectors are used as the key corresponding to each cell. The score data is stored in a key-value pair where the key is the corresponding discretized feature vector. The value of this key-value pair entry is configured as an ordered list of the statistical metrics representing the score distribution in that cell. This key-value storage provides a mechanism to represent the score data for the discretized grid space and to access this data for the various analyses discussed in the subsequent section.

Finding Robust Predictor Tuples

The individual instances of scores can be explained, first by determining the various combinations of variables from the predictor set, up to N feature variables at a time. It is a usual convention to provide up to three reasons. Hence N is often set of 3, though the methodology described in here can be applied to any required value of N. To avoid giving undue importance to any one factor, a factor analysis is performed to determine a group of variables. This ensures that no single factor is found to unduly drive the explanation. As an example, if there are 10 variables derived from dollar spent, then only one of them should be represented in the explanation. This can be done in a multitude of ways, including utilizing principle component analysis, correlation analysis, mutual information, or other techniques. In accordance with some systems and method, the variables in the predictor set are grouped together into variable groups of similar type.

The number of groups of variables can be denoted by $N_G$. Once the groupings are available, the following selection process is performed:

Tuples of 1: By a random selection process, one variable from each of the groups is selected. $N_G$ singleton variables are selected in this fashion.

Tuples of 2: Two groups are combined in iterative manner. Then one variable from each of the groups is selected to form pairs. $N_G*(N_G-1)/2$ pairs are selected in this fashion.

Tuples of 3: Three groups are combined in iterative manner. Then one variable from each of the groups is selected to form triplets. $N_G*(N_G-1)*(N_G-2)/6$ triplets are selected in this fashion.

For N>3, tuples of up to N groups are considered in a process identical to the ones described in the previous clauses. For the rest of the discussion, assume N=3.

Figure 14:
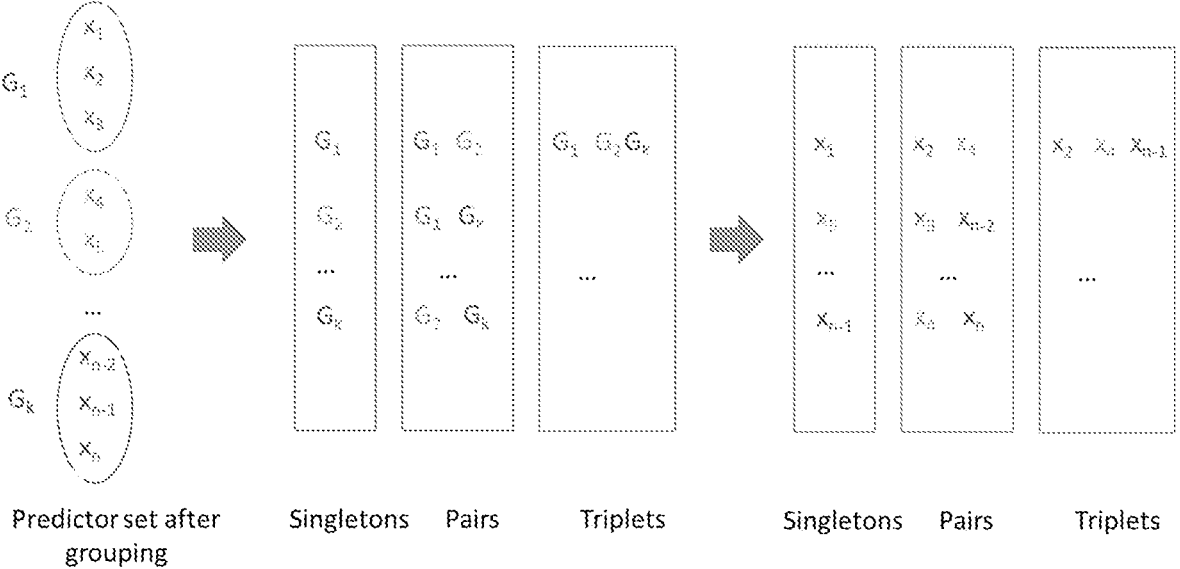
FIG. 14 shows tuples of predictor variables as a schematic representation of creation of singletons, pairs and triplets starting from a set of variables in the predictor set which have been grouped together using factor analysis.

FIG. 14 shows tuples of predictor variables as a schematic representation of creation of singletons, pairs and triplets starting from a set of variables in the predictor set which have been grouped together using factor analysis. G represents the factor groups of the variables represented by x. Recall that the original variables are represented by x and discretized variables are represented by z.

For each of the tuples of variables, whether singletons, pairs or triplets, grid transformation is applied. Then grid compaction is applied starting from the score storage. As the compaction happens, the statistical metrics for the compacted cells need to be updated. The process for generating statistical measure is described below.

Once the statistics are available for each of the tuples of variables, whether singletons, pairs or triplets, they are evaluated to determine if they have robust statistics to act as a provider of explanation. For this purpose, we resort to calculating a spread of a statistical metric across all cells for each tuple of predictor variables Recall that each tuple is a compacted grid. Consider a triplet. Let the discretized feature vectors of this grid be indexed by i, j and k. (Same method can be applied to singletons and pairs as well.) Let $m_{ijk}$ represent the statistical metric of the score distribution in each cell. The mean and standard deviation of this metric are computed as follows:

$$\mu = \frac{\sum_{ijk} m_{ijk}}{\sum_{ijk} 1}$$

$$\sigma = \sqrt{\frac{\sum_{ijk} (m_{ijk} - \mu_i)^2}{\sum_{ijk} 1}}$$

The tuples that show little variability in score distribution are discarded in a pruning process. After discarding such tuples, what is left are the set of potential explanations. These are the predictor tuples used in explanation of the model score and are called candidate explanation tuples.

Combining Statistics of Multiple Cells

During the grid compaction process described above, it becomes necessary to combine the statistical metrics of the cells being combined to arrive at the statistical metrics for the combined cell.

In some implementations, a method includes combining statistics from two cells, 1 and 2, to arrive at the overall statistics. In some specific implementations, a mean and standard deviation are used as the statistical metrics. As an example, let the mean and standard deviation metrics for the two cells, 1 and 2, be denoted as $\{\mu_1, \sigma_1\}$ and $\{\mu_2, \sigma_2\}$ respectively. Furthermore, from the compacted coverage grid, let the coverage of the two cells be $n_1$ and $n_2$ respectively.

The mean of the combined cell is given by:

$$\mu = \frac{n_1 \mu_1 + n_2 \mu_2}{n_1 + n_2}$$

The standard deviation of the combined cell is given by:

$$\sigma = \sqrt{\frac{n_1 \sigma_1^2 + n_2 \sigma_2^2 + n_1 (\mu - \mu_1)^2 + n_2 (\mu - \mu_2)^2}{n_1 + n_2}}$$

Further, the combined coverage is given by:

$$n = n_1 + n_2$$

The process for combining statistical metrics for multiple groups is identical to the process for combining two groups. It can be derived from the above equations in an iterative manner, and through expansion of the terms.

Assigning Explanations to Scores

Figure 15:
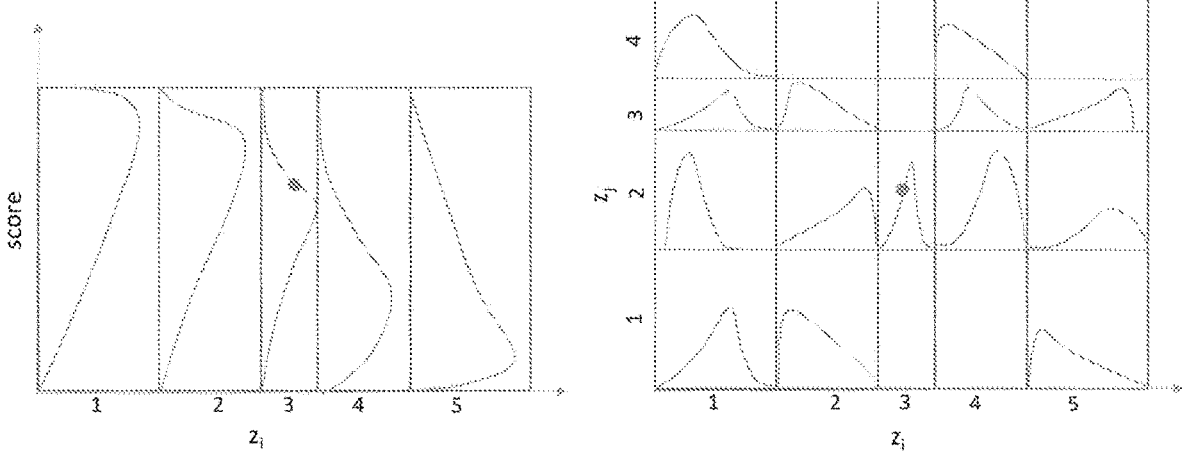
FIG. 15 is a schematic representation of the membership of the data point, shown as a dot, in several compacted score storage grids corresponding to different tuples of discretized predictor variables, $z_i$ and $z_j$.

Each candidate explanation tuple has a score distribution for each cell in terms of statistical metrics of interest. As an example, a data point for which explanation is sought has a score S. The data point resides in a specific cell for each of the tuples, whether singletons, pairs or triplets. This is schematically represented in the FIG. 15 with the position of the data point, shown as a dot, representing the model score of that data point. The position of the data point represents the model score of that data point. In the example, a singleton and a pair of discretized predictor variables are shown as potential explanations.

For the cells that the data point belongs to, a normalized distance is computed between the model score, S, and the cell's expected score. For the case, where mean and standard deviation are used as statistical metric for the score distribution, the normalized distance for tuple k is given as follows:

$$\hat{D}_k = \frac{S - \mu_k}{\sigma_k}$$

Where, $\mu_k$ and $\sigma_k$ are the mean and standard deviation of the score distribution for the cell that the data point resides in for the given tuple, k. This normalized distance can translate to the likelihood of score, P(S|k), that the score is due to the combination of input values corresponding to the variables in the tuple, where large distances result in lower probability of explanation.

$$\text{Explanation} = \text{argmax}(P(S|k)) = \text{argmax}(1/\hat{D}_k)$$

The measures $\mu_k$ and $\sigma_k$ provide a mechanism to access the probability density function of the score distribution. P(S|k) may also be computed based on a more granular representation of the complete score distribution to compute the observed likelihood within a score range:

Thus, the explanation derives from the global support for the score as derived from the training dataset. This approach is superior to the other global support-based methods, as it ends up taking the overall score distribution in consideration and provides for variety of different measures, depending on the statistical metrics that we store. Second, it is well understood that variables often work in tandem to influence the score. Hence just looking at singletons in isolation, as done in other methods, is not sufficient. Pairs and triplets provide a very effective mechanism to identify the interactions. For N>3, more complex interactions can be used as explanations, though practical experience suggests that often N=3 is sufficient and also conforms to explainability requirements.

At the time of scoring in production, a first grid transformation is applied to the data point as described above. Then, through a lookup process, the compacted score storage for each candidate explanation tuple is extracted. The process includes one or more steps to find out the explanations, as described above. The number of explanations generated can be variable, and if more than one explanation is required, then the explanations can be accessed according to k by rank ordering $\hat{D}_k$. The required number of tuples are then returned as the explanation for the score.

The main drivers in the present disclosure is that grid compaction allows for analysis of data at scale to identify hidden data bias, and WOE bias in the data so that data scientists can remove or address such bias in the data allowing for robust creation of machine learning and other models where the sizes of data in terms of records and size of the variable space is large and intractable to human analysis. In addition, since explanation is essential the same compaction techniques allows for efficient identification of the explanations through the use of grid compaction and the statistical characteristics of the entire training dataset's score distribution to allow statistical support based creation of reasons that go beyond simple singleton methods that exist today.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method implemented by one or more processors, the method comprising:

discretizing selected variables of a dataset to generate a discretized phase space represented as a grid of a plurality of cells, wherein the dataset comprises a plurality of records;

applying a grid transformation to a first record in the dataset to assign the first record to a first cell of the plurality of cells of the grid;

generating a grid index to reference one or more cells using one or more discretized feature vectors;

creating a grid storage for storing the plurality of records assigned to the one or more cells of the grid;

creating a coverage storage, separate from a grid storage, for storing data representing a number of records assigned to the one or more cells, wherein coverage storage provides a summary of a count of data points in the plurality of cells in the discretized phase space;

scoring a record in the dataset using a machine learning model trained on the dataset;

storing the scores for the one or more cells in a score storage;

generating score distribution statistics and probability density functions of the scores associated with at least one of a single variable, pair of variables, and triplet of variables;

assigning explanation tuples for a new scored transaction utilizing distance and probability measures of the score being most probable based on statistics of score probability density functions stored in the grid storage for at least one of the single variable, pair of variables, and triplet of variables;

providing the explanation tuples to help identify biases in the data; and using the identified biases to automatically adjust a parameter of the machine learning model to mitigate the bias in a subsequent model iteration.

2. The method of claim 1, wherein the dataset comprising a plurality of records, a first record of the plurality of records having a first value and a first unique identifier (ID).

3. The method of claim 1, wherein the first value stored for the record is represented as a key value pair of class label and referenced information for a corresponding class label.

4. The method of claim 2, further comprising applying compaction to the coverage storage, wherein the coverage data is aggregated from a higher dimensional grid to a grid formed by a subset of the selected variables.

5. The method of claim 1, further comprising:

applying compaction to a subset of the selected variables; and generating a trivariate heatmap that visualize a plotted intersection of the selected variables, and a plot for a bin of a third variable, the trivariate heatmap identifying distinct patterns in the dataset, wherein a 2-dimensional bin showing nonlinearity represents a bias or correlations in the dataset that are non-causal.

6. The method of claim 5, further comprising:

computing for binary class data, a weight of evidence (WOE) for the plurality of cells based on a coverage of a class in the cell; and plotting the WOE in a trivariate heatmap to identify biased class distribution in the dataset as a function of the selected variables, and a plot for a bin of the third variable, the trivariate heatmap identifying distinct WOE patterns in the dataset, wherein a 2-dimensional bin showing nonlinearity represents a bias or correlations in the dataset that are non-causal.

7. The method of claim 1, wherein the first cell has a first discretized feature associated with a first discretized feature vector.

8. The method of claim 1, wherein the grid storage uses a first ID of the first record as a reference to the first record and a first discretized feature vector as a key to the first cell.

9. The method of claim 1, wherein the grid storage uses a second discretized feature vector as a key to a second cell having the same first discretized feature as-4-that associated with the first cell.

10. The method of claim 1, wherein a maximum probability expectation is to assign the single variable, pair of variables, and/or triplet of variables that serve as the explanation tuples of the transaction score.

11. A system for analyzing coverage, bias and model explanations in large dimensional modeling data, the system comprising:

at least one programmable processor, and a non-transitory, machine-readable medium storing instructions that, when executed by the at least one programmable processor, cause the at least one programmable processor to perform operations comprising:

discretizing selected variables of a dataset to generate a discretized phase space represented as a grid of a plurality of cells, wherein the dataset comprises a plurality of records;

applying a grid transformation to a first record in the dataset to assign the first record to a first cell of the plurality of cells of the grid;

generating a grid index to reference one or more cells using one or more discretized feature vectors;

creating a grid storage for storing the plurality of records assigned to the one or more cells of the grid;

creating a coverage storage, separate from a grid storage, for storing data representing a number of records assigned to the one or more cells, wherein coverage storage provides a summary of a count of data points in the plurality of cells in the discretized phase space;

scoring a record in the dataset using a machine learning model trained on the dataset;

storing the scores for the one or more cells in a score storage;

generating score distribution statistics and probability density functions of the scores associated with at least one of a single variable, pair of variables, and triplet of variables;

assigning explanation tuples for a new scored transaction utilizing distance and probability measures of the score being most probable based on statistics of score probability density functions stored in the grid storage for at least one of the single variable, pair of variables, and triplet of variables;

providing the explanation tuples, via one or more processors, to help identify biases in the data; and using the identified biases to automatically adjust a parameter of the machine learning model to mitigate the bias in a subsequent model iteration.

12. The system of claim 11, wherein the dataset comprising a plurality of records, a first record of the plurality of records having a first value and a first unique identifier (ID).

13. The system of claim 12, wherein the first value for the first record is represented as a key value pair of class label and referenced information for a corresponding class label.

14. The system of claim 11, wherein the operations further comprise:

applying compaction to the coverage storage, wherein the coverage data is aggregated from a higher dimensional grid to a grid formed by a subset of the selected variables.

15. The system of claim 11, wherein the operations further comprise:

applying compaction to a subset of the selected variables; and generating a trivariate heatmap that visualize a plotted intersection of the selected variables, and a plot for a bin of a third variable, the trivariate heatmap identifying distinct patterns in the dataset, wherein a 2-dimensional bin showing nonlinearity represents a bias or correlations in the dataset that are non-causal.

16. The system of claim 15, wherein the operations further comprise:

computing for binary class data, a weight of evidence (WOE) for the plurality of cells based on a coverage of a class in the cell; and plotting the WOE in a trivariate heatmap to identify biased class distribution in the dataset as a function of the selected variables, and a plot for a bin of the third variable, the-6-trivariate heatmap identifying distinct WOE patterns in the dataset, wherein a 2-dimensional bin showing nonlinearity represents a bias or correlations in the dataset that are non-causal.

17. The system of claim 11, wherein the first cell has a first discretized feature associated with a first discretized feature vector.

18. The system of claim 11, wherein the grid storage uses a first ID of the first record as a reference to the first record and a first discretized feature vector as a key to the first cell.

19. The system of claim 11, wherein the grid storage uses a second discretized feature vector as a key to a second cell having the same first discretized feature as that associated with the first cell.

20. The system of claim 11, wherein a maximum probability expectation is to assign the single variable, pair of variables, and/or triplet of variables that serve as the explanation tuples of the transaction score.

* * * * *